(12) United States Patent
Nagano et al.

(10) Patent No.: US 7,219,650 B2
(45) Date of Patent: May 22, 2007

(54) CONTROL APPARATUS OF FUEL INJECTION TYPE INTERNAL COMBUSTION ENGINE

(75) Inventors: Masami Nagano, Hitachinaka (JP); Junichi Noda, Naka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/442,156

(22) Filed: May 30, 2006

(65) Prior Publication Data

US 2006/0266331 A1 Nov. 30, 2006

(30) Foreign Application Priority Data

May 31, 2005 (JP) ............................... 2005-160124

(51) Int. Cl.
*F02B 3/02* (2006.01)
*F02B 3/12* (2006.01)
*F02D 41/06* (2006.01)

(52) U.S. Cl. ...................... 123/299; 123/491; 123/685

(58) Field of Classification Search ............... 123/299, 123/491, 685
See application file for complete search history.

(56) References Cited

U.S. PATENT DOCUMENTS 5,713,328 A * 2/1998 Anderson et al. ........... 123/299
6,085,718 A * 7/2000 Nishimura et al. ......... 123/299
6,374,798 B1 * 4/2002 Nagai et al. ................ 123/491
6,510,834 B1 * 1/2003 Tomita et al. .............. 123/295
6,899,077 B2 * 5/2005 Wagner et al. ............. 123/491
6,907,857 B2 * 6/2005 Saito et al. ................. 123/299
7,047,945 B2 * 5/2006 Ishii et al. .................. 123/491
2001/0039936 A1 * 11/2001 Ichihara et al. ............ 123/299
2004/0123834 A1 * 7/2004 Wagner et al. ............. 123/299

FOREIGN PATENT DOCUMENTS

| JP | 2003-328816 | 11/2003 |
| JP | 2004-28031 | 1/2004 |
| JP | 2004-52660 | 2/2004 |

* cited by examiner

*Primary Examiner*—Erick Solis
(74) *Attorney, Agent, or Firm*—Crowell & Moring LLP

(57) ABSTRACT

The invention improves a combustion at a starting time by refining a fuel at a time of starting the engine so as to minimize an amount of the fuel attached to a wall surface and appropriately form an air-fuel mixture. When the engine starts, a control apparatus executes a control of increasing a fuel pressure supplied to a fuel injector in comparison with a normal operating time just after the engine start, and a divisional injection control of divisionally injecting the fuel injection for one cycle of the engine by the fuel injector at a plurality of times.

9 Claims, 17 Drawing Sheets

EXHAUST PIPE 0.3MPa 0.5MPa

○ : SUCTION STROKE  ▨ : FUEL INJECTION

CONTROL APPARATUS OF FUEL INJECTION TYPE INTERNAL COMBUSTION ENGINE

BACKGROUND OF THE INVENTION

1. Field of the Invention

The present invention relates to a control apparatus of a fuel injection type internal combustion engine, and more particularly to a control apparatus of a fuel injection type internal combustion engine which executes an improvement of a combustion at an engine starting time (a cold engine time).

2. Description of Related Art

In a fuel injection type internal combustion engine in which a fuel injection is executed in each of cylinders by a fuel injection valve, there is a structure in which a fuel injection for one cycle of the engine is executed divisionally by a plurality of times (for example, patent document 1 (JP-A-2004-52660)).

The fuel injection type internal combustion engine corresponds to an internal combustion engine structured such as to directly inject a fuel into a combustion chamber (a cylinder) and ignite by a spark. Since both of a cylinder temperature and a cylinder pressure in the combustion chamber are in a low state at a time point of executing a premixed fuel injection, in comparison with a time of executing a main fuel injection, it is necessary to refine the fuel so as to set to an easily vaporized state.

Accordingly, there is executed a matter of enlarging an angle of diffusive injection of the injected fuel for improving a mixture between the fuel and the air by using a fuel injection valve with a swirl nozzle. In this case, if the angle of diffusive injection of the fuel is made too large, the injected fuel comes into collision with a side wall within the cylinder of the combustion chamber and an amount of attached fuel is increased.

In relation to this matter, there is executed a matter of judging by a contact judging means whether or not the fuel injected from the fuel injection valve in a suction stroke is brought into contact with the inner surface of the cylinder, at a time of a high load of the internal combustion engine, executing a compensation by increasing or decreasing the amount of the injected fuel and increasing or decreasing an injection frequency of the fuel during the suction stroke, in the case that it is judged that the fuel is brought into contact with the inner surface of the cylinder.

With regard to the divisional injection of the divided amount, there is additionally a cylinder injection system in which the injection is executed at two times comprising a suction stroke and a compression stroke, thereby suppressing a generation of a black smoke or the like (for example, patent document 2 (JP-A-2003-328816) and patent document 3 (JP-A-2004-28031)).

BRIEF SUMMARY OF THE INVENTION

In order to correspond to an emission requirement which becomes more and more severe for the future, it is necessary to improve a combustion at a cold engine time just after the engine start from the engine start. For this purpose, it is requested to appropriately form an air-fuel mixture between the fuel and the air within the combustion chamber of the internal combustion engine.

The present invention is made by taking the points mentioned above into consideration, and an object of the present invention is to provide a control apparatus of an internal combustion engine which can improve a combustion at a starting time by refining a fuel at a time of starting the engine so as to minimize an amount of the fuel attached to a wall surface and appropriately form an air-fuel mixture.

In accordance with the present invention, there is provided a control apparatus of a fuel injection type internal combustion engine provided with a fuel injection means executing a fuel injection in each of cylinders, wherein at a time of the engine starts (just after the engine starts from the engine start), the control apparatus executes a control of increasing a fuel pressure supplied to the fuel injection means in comparison with a normal operating time just after the engine start, and a divisional injection control of divisionally injecting the fuel injection for one cycle of the engine by the fuel injection means at a plurality of times.

In accordance with the present invention, there is provided a control apparatus of a fuel injection type internal combustion engine provided with a fuel injection means executing a fuel injection in each of cylinders, wherein at a time of the engine starts, the control apparatus executes a control of increasing a fuel pressure supplied to the fuel injection means in comparison with a normal operating time just after the engine start, and a divisional injection control of divisionally injecting the fuel injection for one cycle of the engine by the fuel injection means at a plurality of times during a suction stroke.

The control apparatus of the fuel injection type internal combustion engine in accordance with the present invention preferably executes a control of changing the fuel injection timing from a suction stroke time to an exhaust stroke time in correspondence to a state of the internal combustion engine after starting the engine.

The control apparatus of the fuel injection type internal combustion engine in accordance with the present invention preferably executes a control of setting an injection timing in a suction stroke to a crank angle position having a high air flow speed at a time of starting the engine, and changing the injection timing to a crank angle position having a low air flow speed in correspondence to an engine speed after the engine speed starts ascending.

The control apparatus of the fuel injection type internal combustion engine in accordance with the present invention preferably executes a control of retarding an ignition timing, at a divisional injection control time.

The control apparatus of the fuel injection type internal combustion engine in accordance with the present invention preferably executes a control of supplying a secondary air to an engine exhaust passage after the divisional injection control is finished.

EFFECT OF THE INVENTION

In accordance with the control apparatus of the fuel injection type internal combustion engine on the basis of the present invention, since the refinement of the fuel is executed by increasing the fuel pressure just after starting the engine from the engine start, and the divisional injection is executed, an amount of the fuel attached to the wall surface is reduced, the air-fuel mixture is appropriately formed, and the combustion at a time of starting the engine is improved.

Other objects, features and advantages of the invention will become apparent from the following description of the embodiments of the invention taken in conjunction with the accompanying drawings.

DETAILED DESCRIPTION OF THE INVENTION

A description will be given in detail of an embodiment of a control apparatus of an internal combustion engine in accordance with the present invention with reference to the accompanying drawings.

Figure 1:
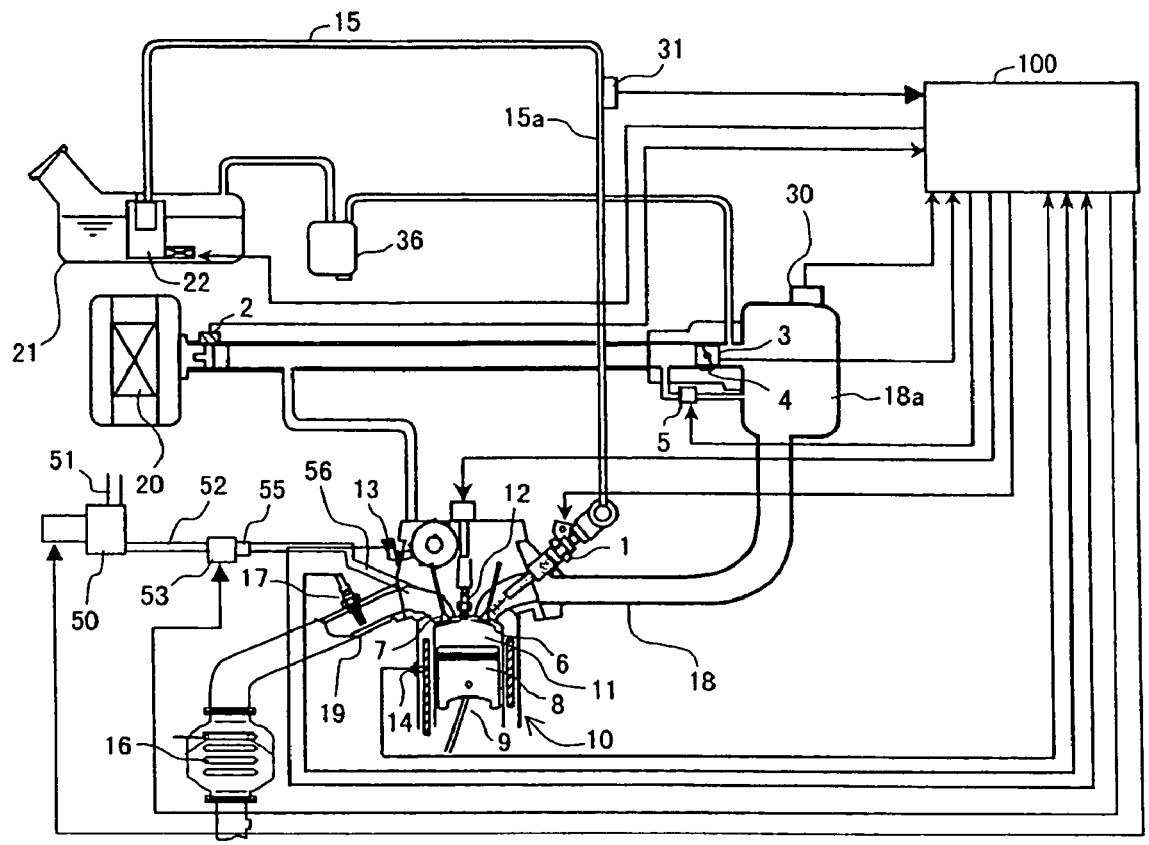
FIG. 1 is a view of an entire structure showing an embodiment of a fuel injection type internal combustion engine to which a control apparatus in accordance with the present invention is applied.

FIG. 1 is a schematic view of an engine structure showing an embodiment of a fuel injection type internal combustion engine to which the present invention is applied.

In FIG. 1, an internal combustion engine 10 is of a multi-valve type having multi cylinders, for example, four cylinders, in which an ignition plug 12 is arranged in each of the cylinders 9, and a combustion chamber 11 is structured by a suction valve 6, an exhaust valve 7 and a piston 8 reciprocating within the cylinder 9.

A suction pipe 18 and an exhaust pipe 19 are connected to each of the cylinders 9. The suction pipe 18 and the exhaust pipe 19 are respectively opened and closed by the suction valve 6 and the exhaust valve 7. The suction pipe 18 is structured as a branched suction pipe having two suction ports.

An air flow sensor (a suction air amount sensor) 2, a throttle sensor 4 and a suction pipe pressure sensor 30 are arranged at respective appropriate positions of the suction pipe 18. The air flows sensor 2 measures a suction air flow amount, the throttle sensor 4 measures an opening degree of the throttle valve 3, and the suction pipe pressure sensor 30 detects a pressure of the suction pipe (a pressure within a collector 18a), and each of them corresponds to one of operation state detecting means.

Further, a water temperature sensor 14 and a crank angle sensor 13 are arranged at respective appropriate positions of the internal combustion engine 10. The water temperature sensor 14 measures an engine cooling water temperature, and the crank angle sensor 13 measures an engine speed.

An air flowing from an air cleaner 20 provided in an upstream portion of the suction pipe 18 is regulated a flow rate by the throttle valve 3, and mixed with a gasoline injected to the suction passage at a predetermined angle from a fuel injector (the fuel injection valve) 1 corresponding to a fuel injection means so as to be supplied to each of the combustion chambers 11.

The fuel injectors 1 are arranged one by one in an upstream side of each of the cylinders 9 of the four-cylinder internal combustion engine 10, and employs a fuel injection system which is systematized as a multi point injection (MPI).

Figure 2:
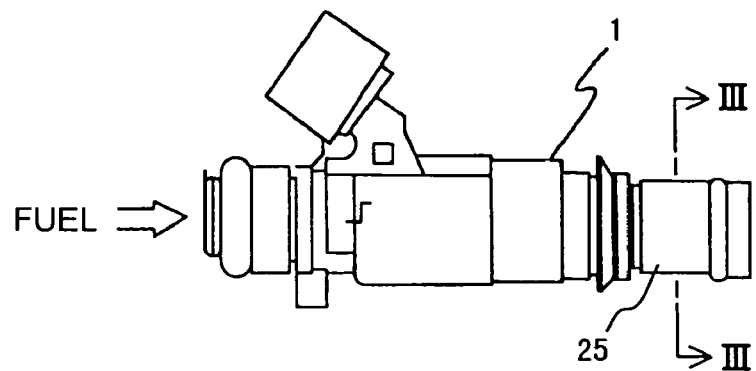
FIG. 2 is a view showing an outer appearance of a fuel injector with a swirler used in the fuel injection type internal combustion engine to which the control apparatus in accordance with the present invention is applied.
Figure 3:
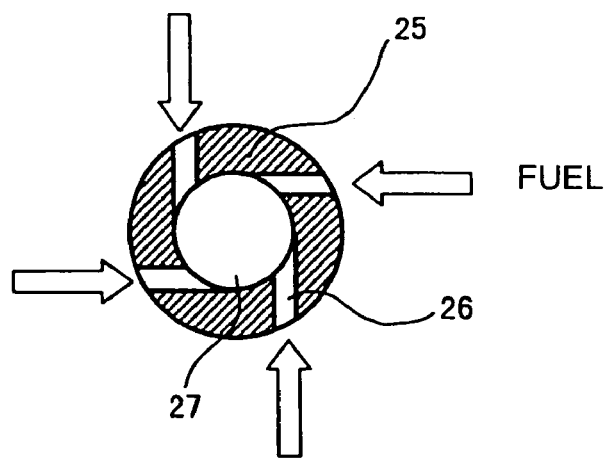
FIG. 3 is a cross sectional view along a line III—III in FIG. 2.

The fuel injector 1 corresponds to a fuel injector with swirler, and has a swirler (a swirl nozzle) 25, as shown in FIGS. 2 and 3. The swirler 25 is arranged in an upstream side of a seat portion of the fuel injector 1, and has a fuel injection passage 26 open to a fuel passage 27 in a tangential direction. A fuel (a liquid fuel) enters into the fuel passage 27 from the fuel injection passage 26, and is injected into the suction pipe 18 in a state of being swirled.

The fuel from the fuel tank 21 is sucked and pressurized by the fuel pump 22, and is thereafter introduced to the fuel inlet of the fuel injector 1 through a fuel piping 15 and a fuel gallery 15a.

The fuel pump 22 corresponds to a drive circuit integral type motor-driven pump, and can variably set a discharge pressure, that is, a fuel pressure on the basis of a current control (a duty ratio control). The fuel gallery 15a is provided with a fuel pressure sensor 31 detecting a pressure of the fuel supplied to the fuel injector 1.

In this case, the fuel evaporated from the fuel tank 21 is captures by a canister 36 and is inhibited from being discharged to an atmospheric air.

The exhaust gas burning in the combustion chamber 11 is introduced to a catalyst converter 16 through an exhaust pipe 19, and is discharged after being purified.

An air fuel ratio sensor 17 is arranged at an appropriate position of the exhaust pipe 19. The air fuel ratio sensor 17 outputs a wide and linear air fuel ratio signal in proportion to a concentration of an oxygen in the exhaust gas.

A secondary air supply system is attached to the internal combustion engine 10. The secondary air supply apparatus has an air pump 50. The air pump 50 sucks an air from an inlet 51, and the air is pressure fed as a secondary air to a piping 52 and is supplied to the exhaust pipe 19 from a supply pipe 56 via an opening and closing valve 53 and a check valve 55.

Engine controls such as a fuel injection control, a fuel pressure control, an ignition timing control, a secondary air supply control and the like of the internal combustion engine 10 are all executed by an electronic control type control unit 100.

Figure 4:
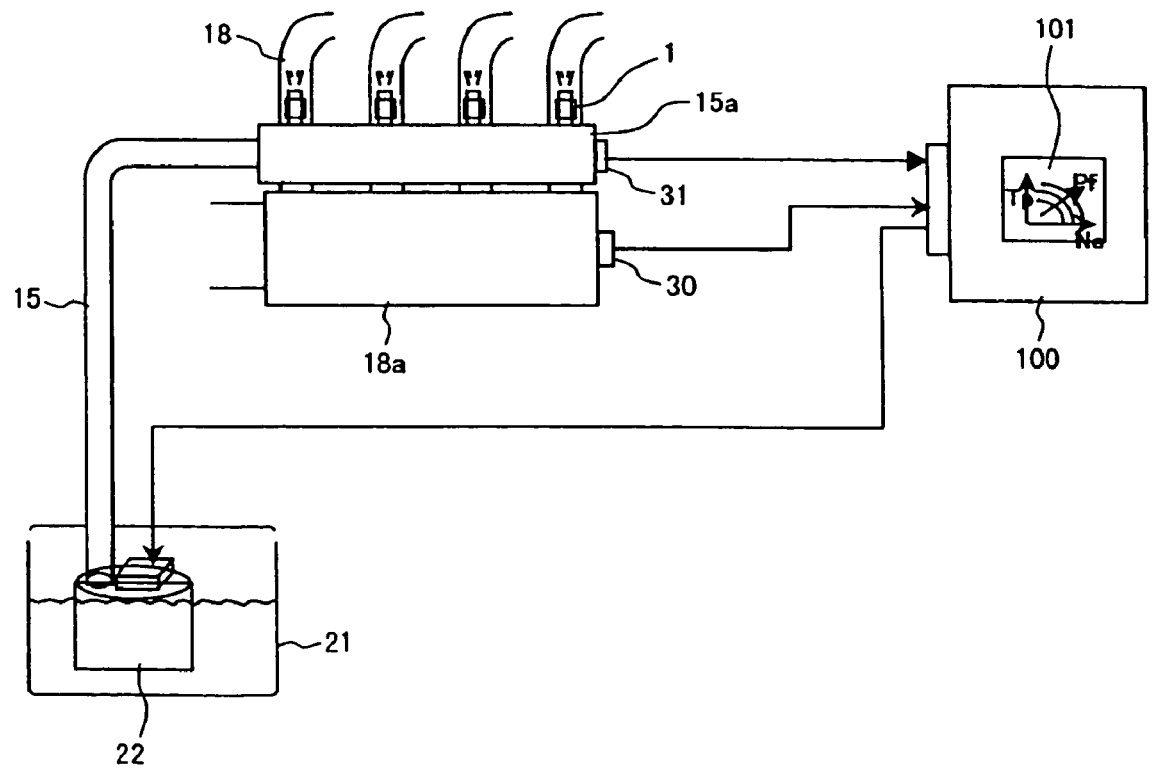
FIG. 4 is a schematic view picking up and showing a fuel system in accordance with the present embodiment.

FIG. 4 is a view showing a fuel system picked up from the structures described above. The control unit 100 has a control target fuel pressure map data 101 in which a fuel pressure is set in correspondence to an operation state (an engine torque and a rotating speed). The fuel pressure is set on the basis of a differential pressure from the suction pipe pressure. The control unit 100 controls a current application to the fuel pump 22 so as to execute a fuel pressure control in a feedback compensating manner in such a manner that a differential pressure between the fuel pressure detected by the fuel pressure sensor 31 arranged in the fuel gallery 15a and the suction pipe pressure sensor 30 arranged in the collector 18a becomes a control target fuel pressure determined in accordance with the operation state.

In the present embodiment, at a time of starting the engine, the control target fuel pressure is set higher in comparison with the normal operating time after starting the engine. Accordingly, the pressure-of the fuel supplied to the fuel injector 1 becomes higher at a time of starting the engine in comparison with the normal operating time after starting the engine.

Figure 5:
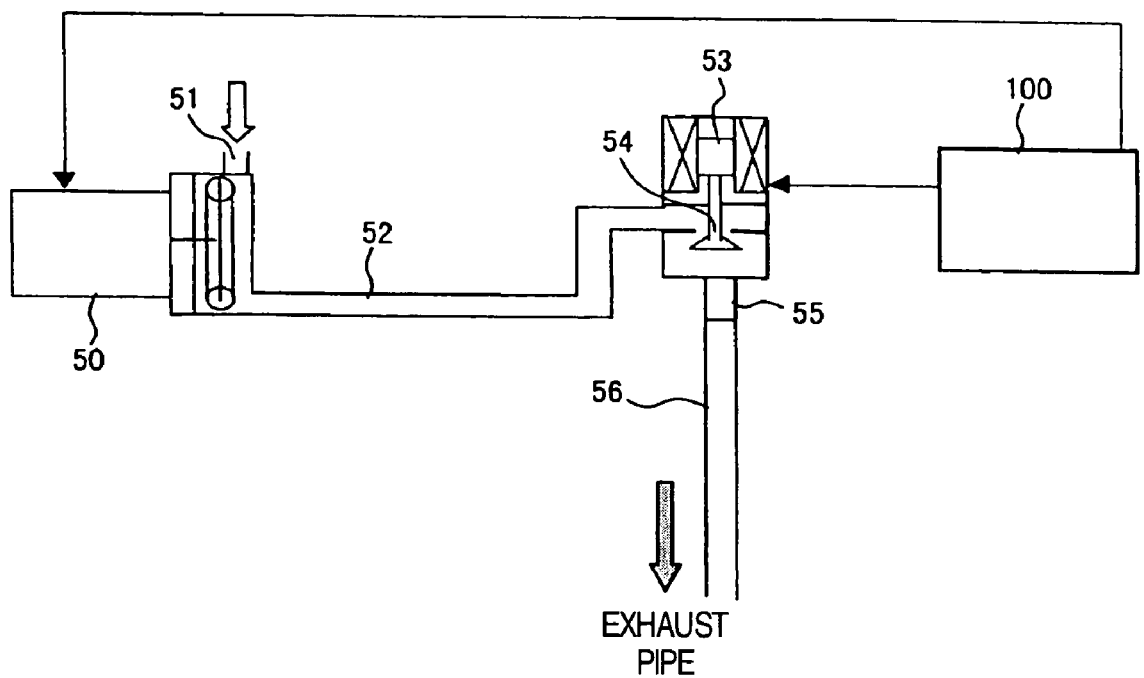
FIG. 5 is a schematic view picking up and showing a secondary air supply system in accordance with the present embodiment.
Figure 6:
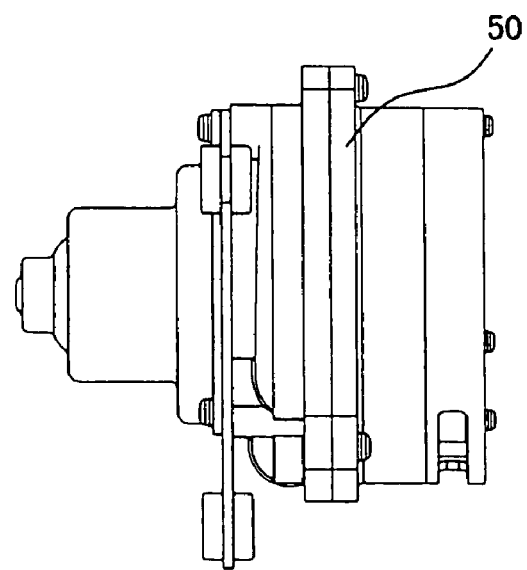
FIG. 6 is a view showing an overview of an air pump.

FIG. 5 is a view showing a secondary air supply system picked up from the structures described above. The secondary air supply system previously sets an operation in correspondence to the operating state by the control unit 100. When an air pump 50 is operated on the basis of a command signal from the control unit 100, and an opening and closing valve 53 is opened, the secondary air is supplied to the exhaust pipe 18 via the check valve 55 and the supply pipe 56. In this case, FIG. 6 shows an overview of the air pump 50.

Figure 7:
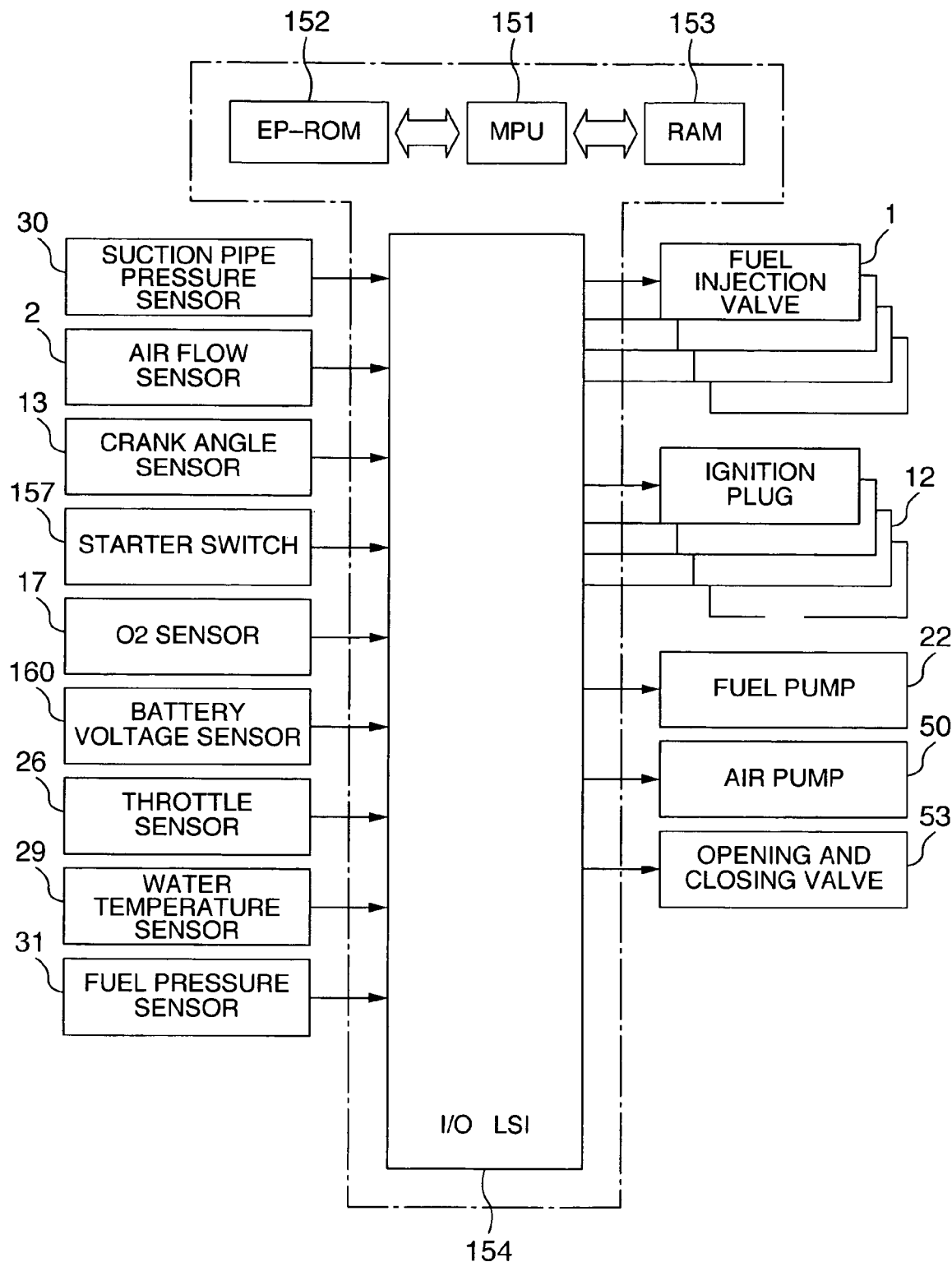
FIG. 7 is a block diagram showing an embodiment of the control apparatus of the fuel injection type internal combustion engine in accordance with the present invention.

The control unit 100 is of a microcomputer type, and is constituted by a multiprocessor unit (MPU) 151, a rewritable non-volatile memory (EP-ROM) 152, a random access memory (RAM) 153, an LSI circuit part corresponding to an input and output circuit inputting a signal indicating an engine operation state detected by the various sensors and outputting a control signal driving the various actuators, that is, an I/O LSI 154 and the like, as shown in FIG. 7.

Specifically, the I/O LSI 154 inputs output signals from the suction pipe pressure sensor 30, the air flow sensor 2, the crank angle sensor 13, the fuel pressure sensor 31, a starter switch 157, the air fuel ratio sensor 17, a water temperature sensor 29, a battery voltage sensor 160 and a throttle sensor 26 via an A-D converter having an I/O LSI built-in or an external A-D converter as occasion demands. The MPU 151 executes a predetermined computation and controls an operation of each of the fuel injector 1 corresponding to an actuator for controlling the engine, the ignition plug 12, the fuel pump 22, the air pump 50 and the opening and closing valve 53.

A basis idea of a reduction of a harmful exhaust gas exists how to improve the combustion so as to prevent the harmful exhaust gas from being output from the internal combustion engine 10 for reducing the exhaust gas just after starting the engine from the engine start, and next exists how to quickly activate the catalyst 16 so as to purify the discharged harmful exhaust gas by the catalyst 16.

Figure 8:
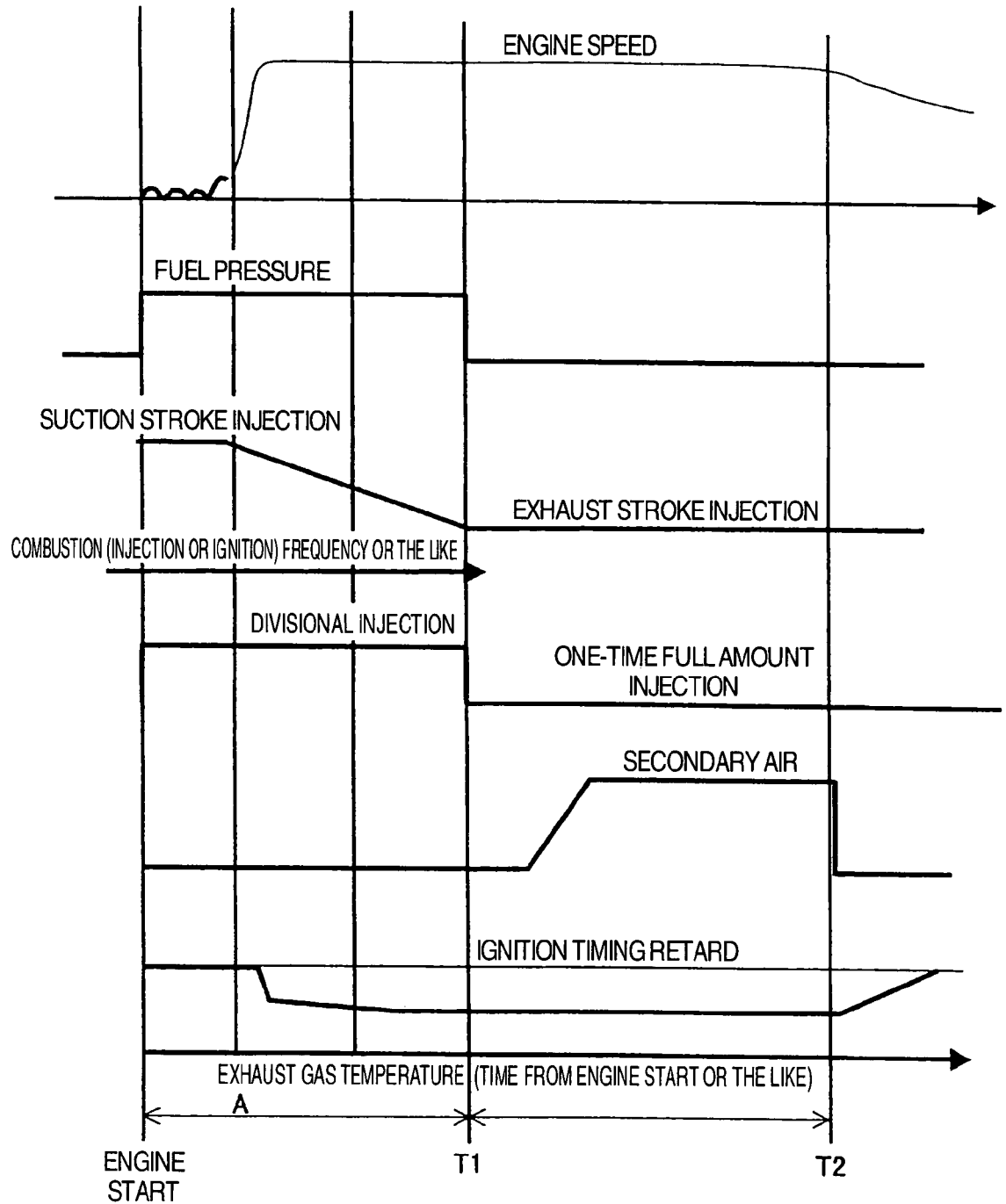
FIG. 8 is a time chart showing an example of an operation of the control apparatus of the fuel injection type internal combustion engine in accordance with the present invention.

On the basis of this matter, in accordance with the present embodiment, the control unit 100 executes the following control as shown in a time chart in FIG. 8.

(1) Until a time point T1 at which some tens seconds have passed after the engine start, the control unit 100 executes a control of increasing a pressure of the fuel supplied to the fuel injector 1 in comparison with the normal operation after starting the engine, and a divisional injection control of divisionally injecting the fuel injection for one engine cycle by the fuel injector 1 at a plurality of times, as an engine starting time control A. The control of increasing the pressure of the fuel supplied to the fuel injector 1 is executed by increasing a fuel discharge pressure of the fuel pump 22 on the basis of an exciting control of the fuel pump 22.

The divisional injection in the engine starting time control A is executed during the suction stroke, and the control is executed so as to change the fuel injection timing from the suction stroke time to the exhaust stroke time in correspondence to the state of the internal combustion engine 100 after starting the engine.

Further, the control unit 100 executes a control so as to set the fuel injection timing to a crank angle position at which the air flow speed is higher at the engine starting time, and change the fuel injection timing to a crank angle position at which the air flow speed is low in correspondence to the engine speed if the engine speed starts ascending.

Further, the control unit 100 executes a control of retarding the ignition timing in conjunction with the control mentioned above.

Figure 27:
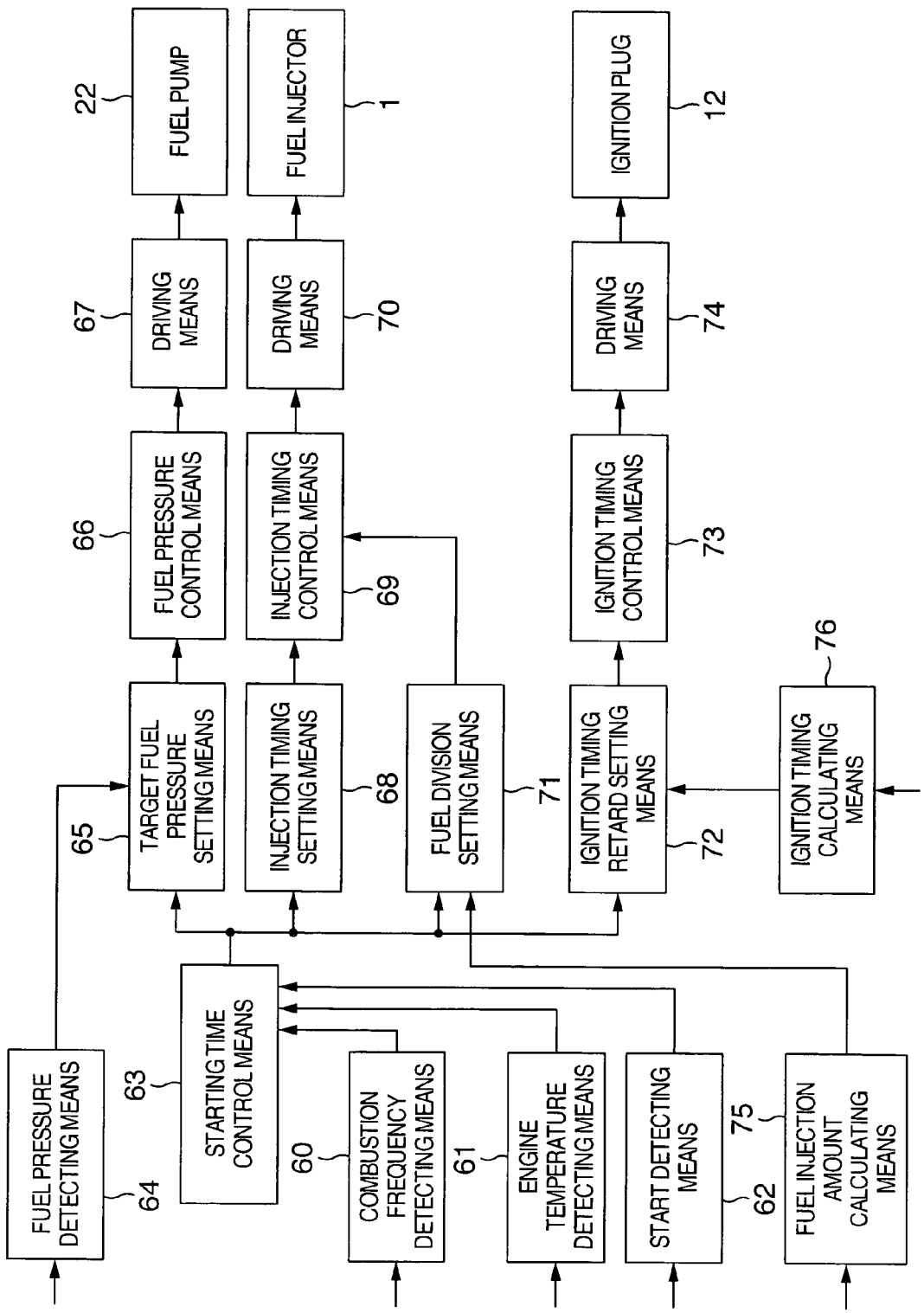
FIG. 27 is a block diagram showing a detailed example of the control apparatus executing a control at a time of starting the engine.

FIG. 27 shows a detailed example of the control apparatus executing the engine starting time control A. In this control apparatus, respective output signals of an engine temperature detecting means 61, a start detecting means 62 and a combustion frequency (injection frequency, ignition frequency or the like) detecting means 60 are sent to a starting time control means 63.

The starting time control means 63 executes a process of the signals from the engine temperature detecting means 61, the start detecting means 62 and the fuel frequency detecting means 60, and sends a predetermined signal to each of a target fuel pressure setting means 65, an injection timing setting means 68, a fuel divisional setting means 71 and an ignition timing retard setting means 72.

The target fuel pressure setting means 65 sends the command signal to the fuel pressure control means 66 in such a manner that the signal from the fuel pressure detecting means 64 computing the differential pressure between the fuel pressure detected by the fuel pressure sensor 31 and the suction pipe pressure detected by the suction pipe pressure sensor 30 becomes the target fuel pressure, and the fuel pump 22 is controlled via a driving means 67.

The signal indicating the fuel injection amount is sent to the fuel divisional setting means 71 from a fuel injection amount calculating means 75, and the signal from the starting time control means is sent to the ignition timing setting means 68. An ignition timing control means 69 executes a computation in which a divisional injection is executed at a predetermined crank angle on the basis of the signals form the injection timing setting means 68 and the fuel dividing means 71, and the fuel injector 1 is driven via the driving means 70.

The ignition timing retard setting means 72 determines a retard amount in correspondence to the operating state on the basis of the signals of the ignition timing calculating means 76 and the starting time control means 63, the signals are sent to the ignition timing control means 73, and the ignition plug 12 is driven via the driving means 74.

(2) After a time point T1, the fuel pressure supplied to the fuel injector 1 is turned back to a normal value at the normal operating time after starting the engine, and the fuel injection control in accordance with the normal one-time full amount injection is executed. The fuel injecting timing at this time is set to the exhaust stroke time.

Further, during a period of a time point T2 at which about one minute has passed from the time point T1, the secondary air is supplied in a state of carrying on the retard of the ignition timing, as a control after starting the engine B.

In this case, there is executed a simulation what effect can be obtained by making the particle diameter of the liquid fuel for the internal combustion engine fine.

Figure 28:
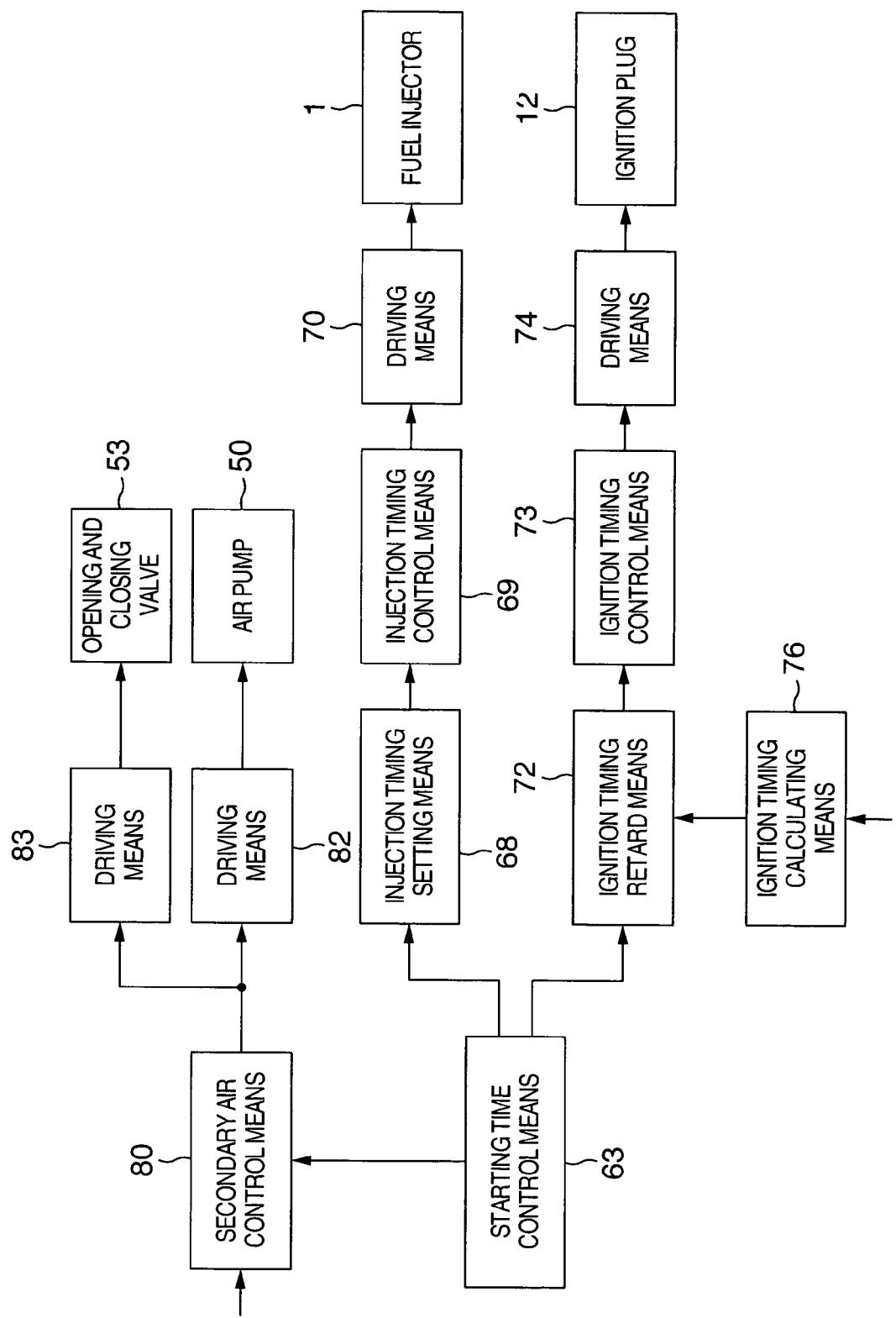
FIG. 28 is a block diagram showing a detailed example of the control apparatus executing a control after starting the engine.

FIG. 28 shows a detailed example of the control apparatus executing the control B after starting the engine. In this control apparatus, a secondary air control means 80 calculates a start timing on the basis of the signal from the starting time control means 63, and the opening and closing valve 53 and the air pump 50 are driven via driving means 82 and 83 on the basis of the start command signal output by the secondary air control means 80. In this case, since the fuel system and the ignition system execute the same operations as the operations described in FIG. 27, a description thereof will be omitted.

Figure 9:
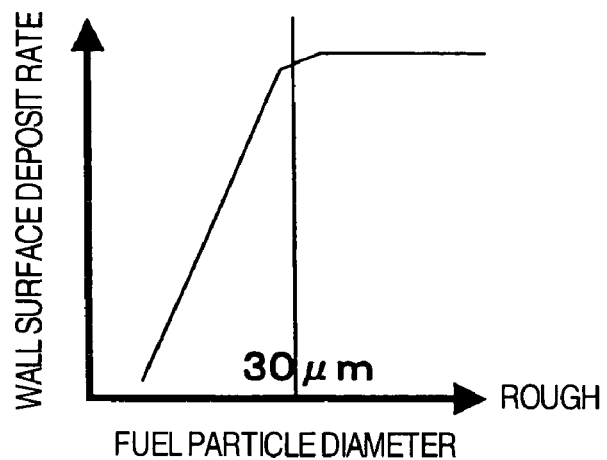
FIG. 9 is a graph showing a result of simulation relating to an attachment of a liquid drop fuel to a wall surface.

FIG. 9 shows a result of simulation relating to the attachment of the liquid drop fuel to the wall surface. It is known that if the particle diameter of the fuel becomes smaller than 30 μm, a deposit rate of the liquid drop fuel to the inner wall surface of the suction pipe or the suction valve is rapidly lowered.

This is because the refined liquid fuel tends to go with the air flow by making the fuel particle diameter small, and the attachment to the inner wall surface of the suction pipe is reduced.

In a state in which the inner wall surface of the suction pipe is warmed up, the fuel is vaporized even if the fuel is attached to the wall surface to a certain degree, however, the refinement of the fuel is considered to be very effective in a cold engine state just after starting the engine from the engine start.

Figure 10:
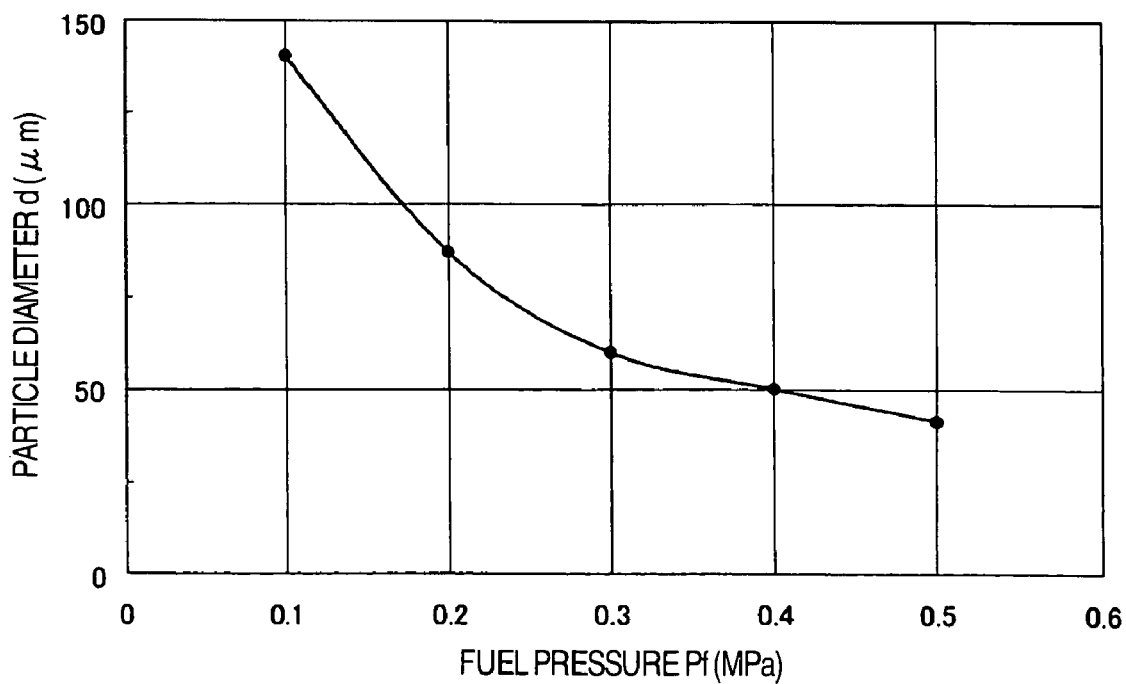
FIG. 10 is a graph showing a relation between a fuel pressure and a fuel particle diameter.

The refinement of the liquid fuel is effectively achieved by making the pressure of the fuel injected from the fuel injector 1 (which is approximately equal to the pressure of the fuel supplied to the fuel injector 1). Accordingly, there is confirmed a relation between the fuel pressure and the particle diameter. FIG. 10 shows a relation between the fuel pressure and the particle diameter of the fuel injected from the fuel injector 1 by setting the fuel pressure to a horizontal axis and setting the particle diameter to a vertical axis.

It is known from this graph that the particle diameter becomes small in accordance with an increase of the fuel pressure. Accordingly, it is known that in order to make the particle diameter of the fuel small from the engine start to just after the engine start, it is effective to make the fuel pressure high.

However, there is a risk that the increase of the fuel pressure in all the driving range causes a man-hour generation such as an overhaul of the parts constituting the current fuel system, a quality identification or the like, an increase of an electric power consumption of the fuel pump, and a cost increase. Therefore, it is considered that the increase of the fuel pressure is executed only in the driving range in which the refinement of the fuel is necessary.

In this connection, the fuel pressure at the normal time is 0.3 Mpa, it is possible to increase the fuel pressure in the engine starting time control A mentioned above from 0.5 to about 0.6 Mpa in the current fuel system, in some specification of the parts such as the piping 15 or the like.

Figure 11A:
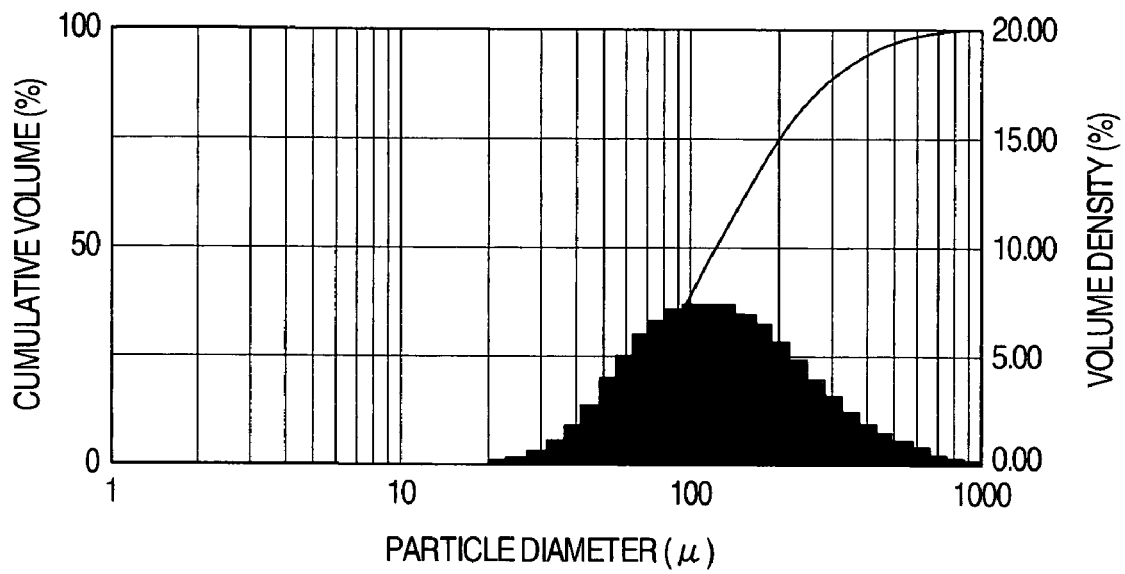
FIG. 11A is a graph showing a distribution of the particle diameter at a time when the fuel pressure is 0.3 MPa.
Figure 11B:
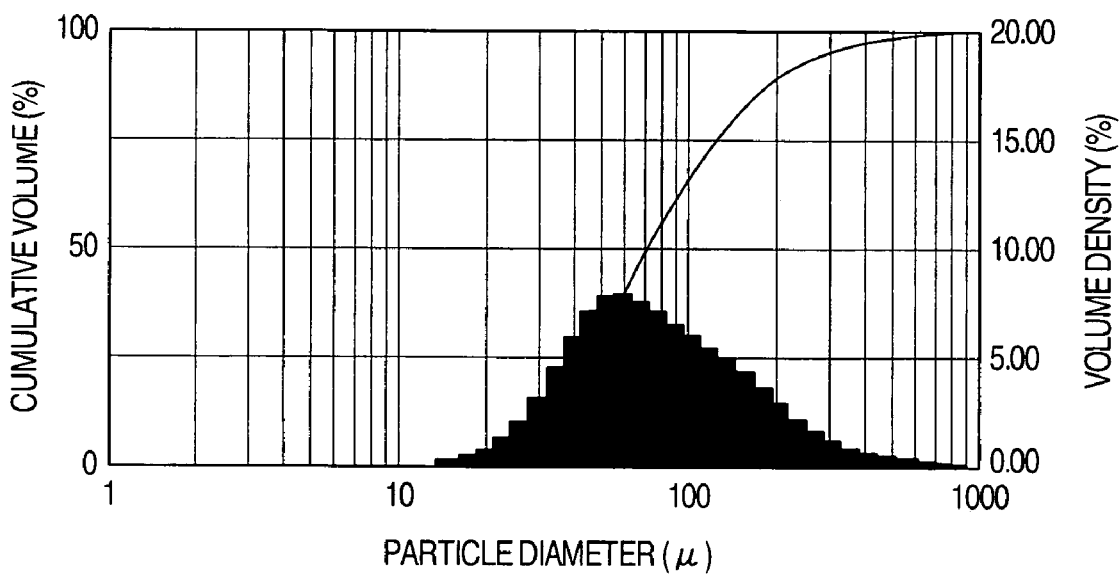
FIG. 11B is a graph showing a distribution of the particle diameter at a time when the fuel pressure is 0.5 MPa.

Fig. 11A shows a distribution of the particle diameter at a time of 0.3 MPa, and FIG. 11B shows a distribution of the fuel particle diameter at a time of 0.5 MPa. Both the drawings show a particle diameter (μ) in a horizontal axis, and a cumulative volume (%) in a vertical axis. It is known that the distribution of the fuel particle diameter shifts to the narrower side by increasing the fuel pressure.

Figure 12:
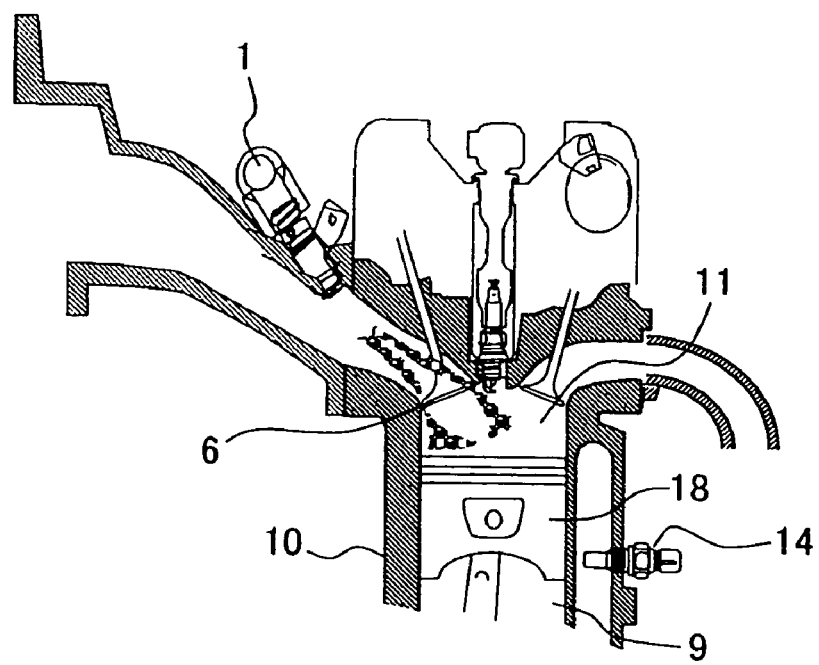
FIG. 12 is a view showing a behavior of the fuel at a time of a suction stroke injection in the present embodiment.

FIG. 12 shows a result obtained by refining the fuel and simulating the state of the suction stroke injection. Since the fuel is refined, it is known that the atomized liquid fuel goes with the air flow and smoothly flows into the combustion chamber 11. Further, since the fuel flows with the air flow within the combustion chamber 11, the attaching amount of the fuel to the side wall surface of the cylinder is reduced, and it is possible to improve the combustion while avoiding the deterioration of the combustion.

Figure 13:
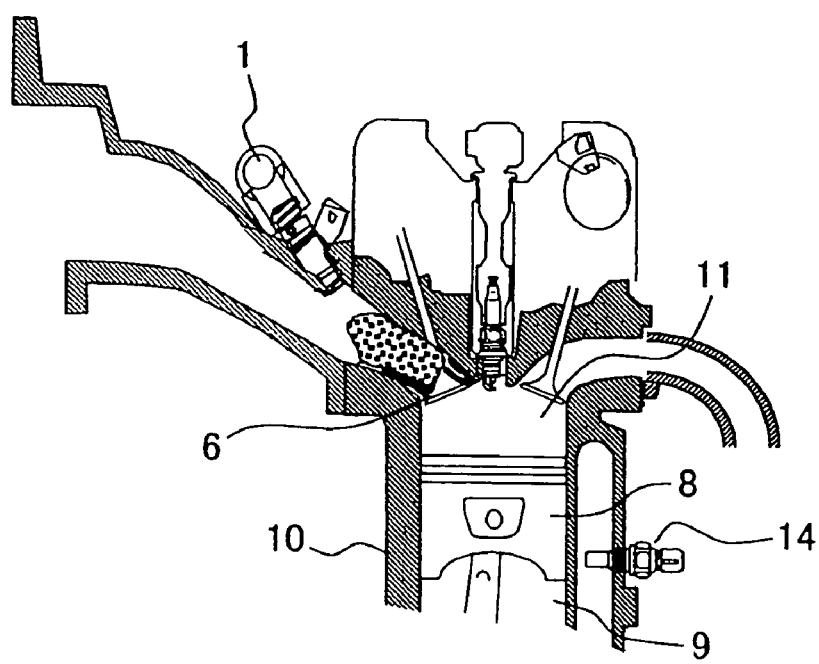
FIG. 13 is a view showing a behavior of the fuel at a time of an exhaust stroke injection in the present embodiment.

FIG. 13 shows a result obtained by simulating the state of the thereafter exhaust stroke injection. In the exhaust stroke injection, the fuel attachment is generated after the suction valve 6 and the portion close thereto are hot, however, the fuel is vaporized. Accordingly, the fuel is smoothly supplied into the combustion chamber 11. Since the fuel is vaporized within the combustion chamber 11, the fuel flows with the air flow. Accordingly, the attaching amount of the fuel to the side wall surface of the cylinder is reduced, and it is possible to improve the combustion while avoiding the deterioration of the combustion.

Figure 14:
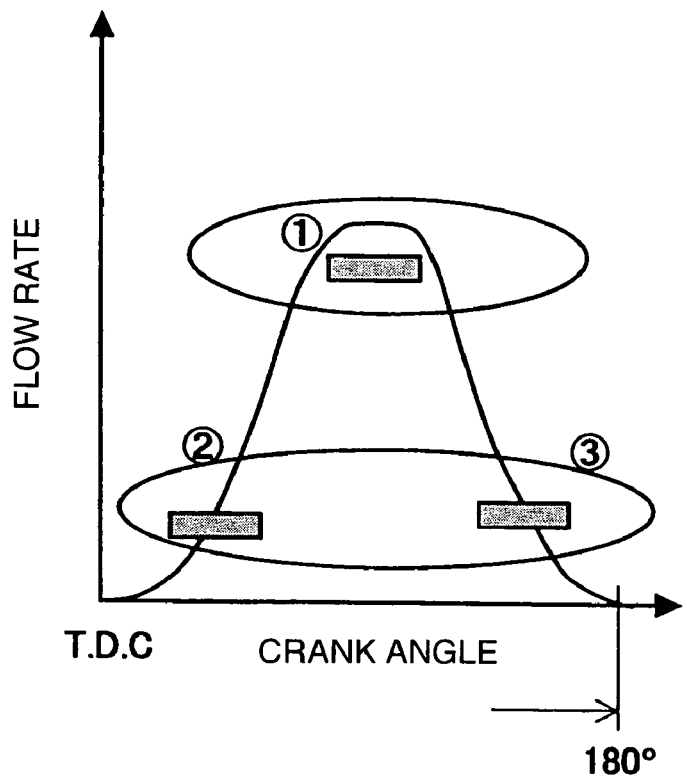
FIG. 14 is a graph showing an air flow speed at a time of the suction stroke.

FIG. 14 shows a flow rate of the air in the suction stroke. In the case that the rotating speed is low such as the cranking time even in the suction stroke injection, the fuel injection is executed at a timing of a crank angular position near a position 1) where the air flow rate is highest.

Since the air flow rate becomes higher in accordance with the increase of the rotating speed, the fuel injection is executed at a timing of a crank angular position 2) or 3) where the air flow rate is low. Since the optimum injection timing 2) side or 3) side is differentiated in accordance with a shape of the suction system, a position of the suction valve 6 and a shape of the piston head surface, respective suitable conformations are necessary.

Next, a description will be given of a usability of the divisional injection in the case of making the fuel pressure high.

Figure 15:
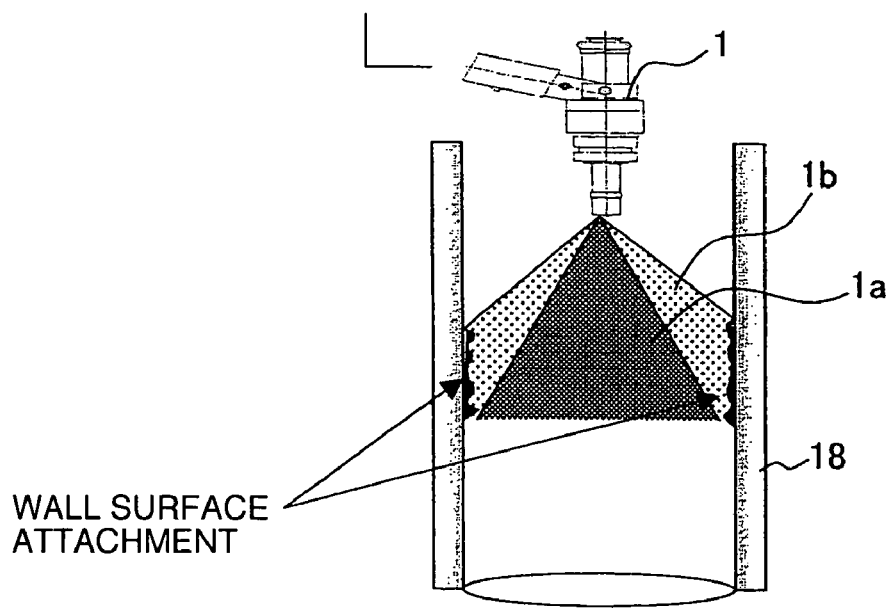
FIG. 15 is a view schematic ally showing a change of a fuel spray on the basis of the fuel pressure.

FIG. 15 schematically shows a fuel spray 1a at a time of the normal fuel pressure, and a fuel spray 1b at a time of the higher fuel pressure. If the fuel pressure is made higher, the particle diameter becomes smaller, however, the angle of the fuel spray becomes wide, and the amount of the fuel attached to the inner wall surface of the suction pipe 18 is increased. Accordingly, the fuel does not smoothly enter into the combustion chamber 11. Therefore, the optimum air-fuel mixture is not formed in the combustion chamber 11, and the combustion is deteriorated. It is known that the effect generated by making the fuel pressure higher can not be obtained in this state.

Figure 16:
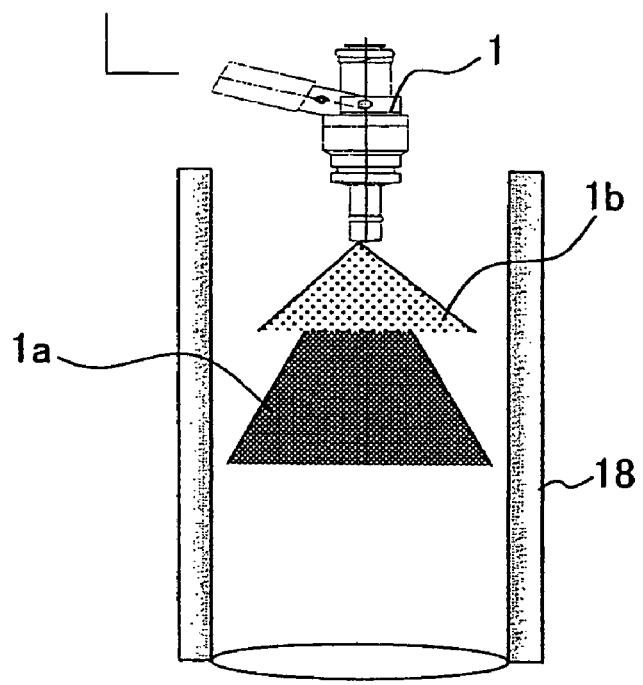
FIG. 16 is a view schematically showing the fuel spray at a time of a divisional injection.
Figure 17:
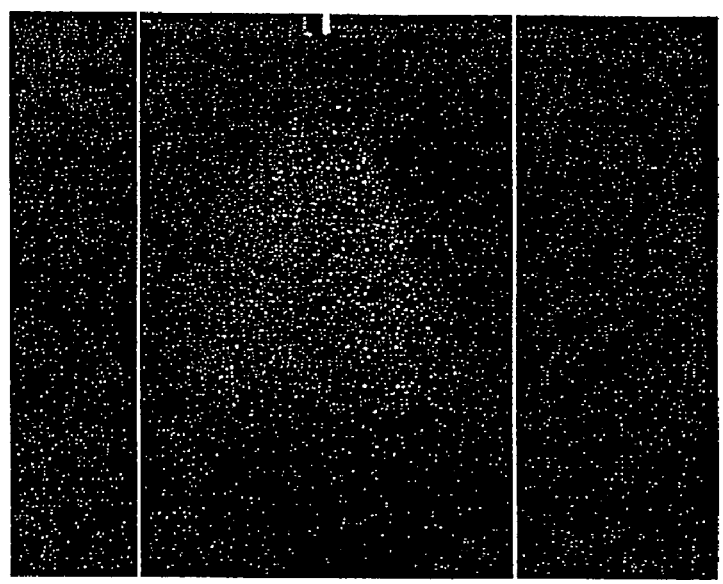
FIG. 17 is a view showing a fuel spray state in the case that an injecting time is long.
Figure 18:
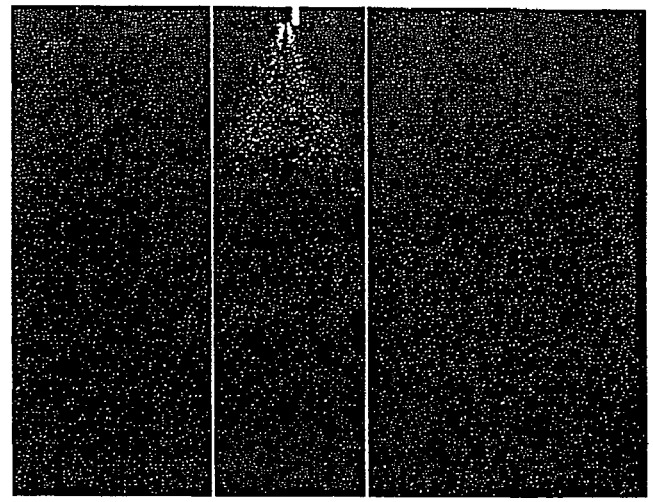
FIG. 18 is a view showing the fuel spray state in the case that the injecting time is short.

The fuel spray is observed. A result obtained by checking out the condition of the fuel spray by an actual machine is shown in FIGS. 17 and 18. FIG. 17 shows a case that the injecting time is long, and FIG. 18 shows a case that the injecting time is short. Further, FIG. 16 schematically shows this matter. FIG. 16 shows the fuel spray 1a in the case that the injecting time is long, and the fuel spray 1b in the case that the injecting time is short. It is known that if the injecting time is made short, the fuel spray does not reach the inner wall surface of the suction pipe 18, and the fuel is not attached to the inner wall surface.

However, the fuel necessary for one suction has been determined. Accordingly, it is considered that the fuel amount necessary for one suction is injected divisionally at a plurality of times.

Figure 19:
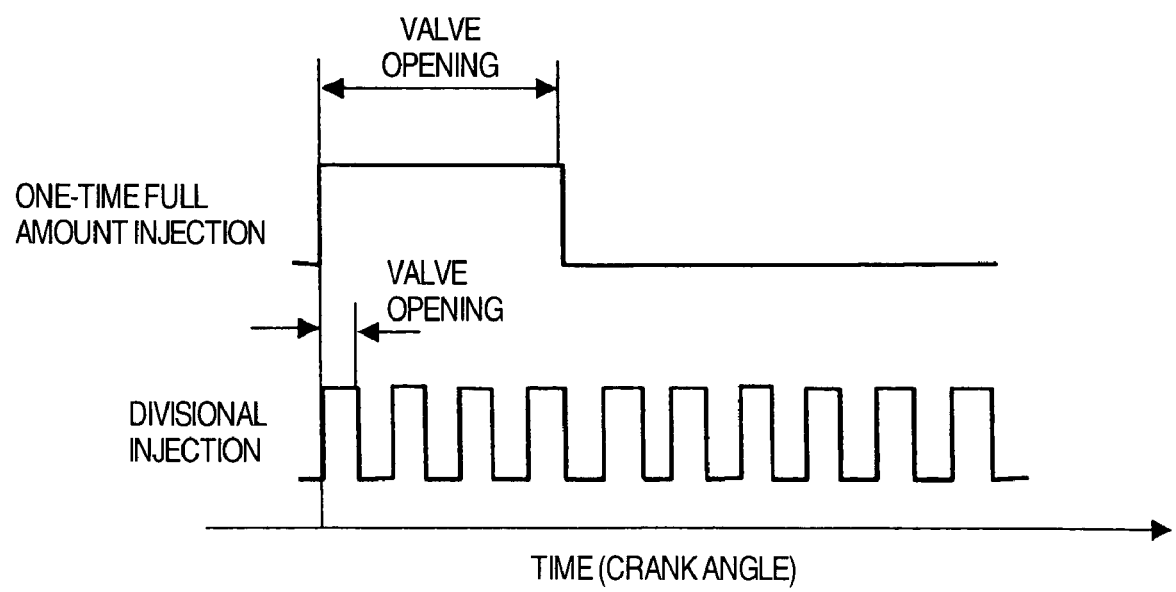
FIG. 19 is a view showing an operation of a fuel injector in the case of a one-time full amount injection and a divisional injection.

FIG. 19 shows a detail of the divisional injection. The injection of the fuel has been conventionally executed by injecting the fuel for one cycle of the engine for a long time at one time, that is, a full amount is injected at one time. However, the divisional injection corresponds to an injection of the fuel for one cycle of the engine for a short time at a plurality of times.

Figure 20:
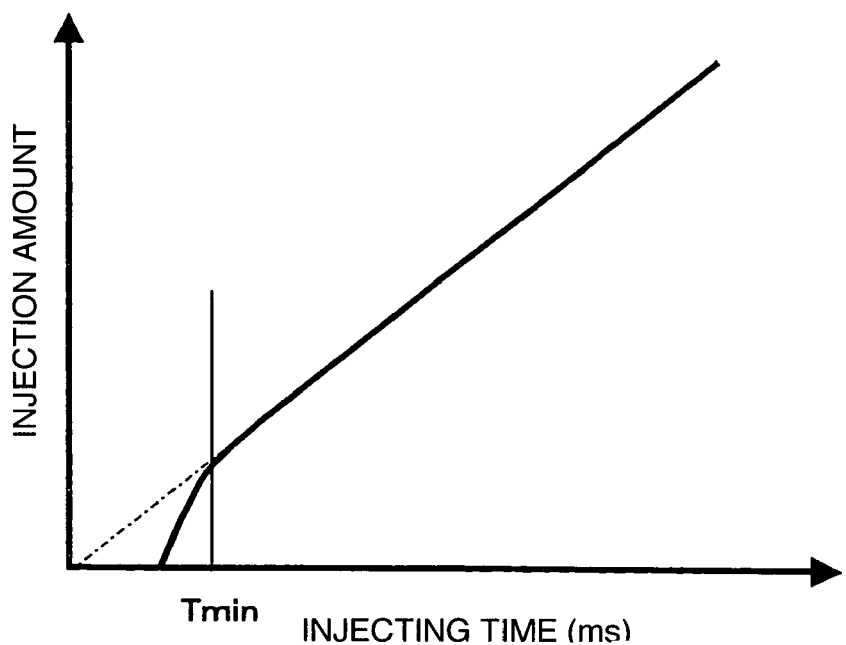
FIG. 20 is a graph showing a relation between an injecting time and an injecting amount of the fuel injector.

The fuel injection can be achieved both of a fixed time interval and a crank angle. A point to be considered is a minimum injection amount of the fuel injector 1. FIG. 20 shows a relation between the injecting time and the injecting amount of the fuel injector 1. In the fuel injector 1, a minimum injecting amount, that is, a minimum injecting time Tmin by which the relation between the injecting time and the injecting amount deflects from a straight line is determined. If the injecting time is shorter than the minimum injecting time Tmin, it is impossible to inject the fuel at an accurate fuel amount. Accordingly, it is necessary to set the divided injecting time for one time longer than the minimum injecting time Tmin. Further, it is necessary to change the injection from the divisional injection to the one-time full amount injection at the normal time before the divisional injection can not be executed.

Figure 21:
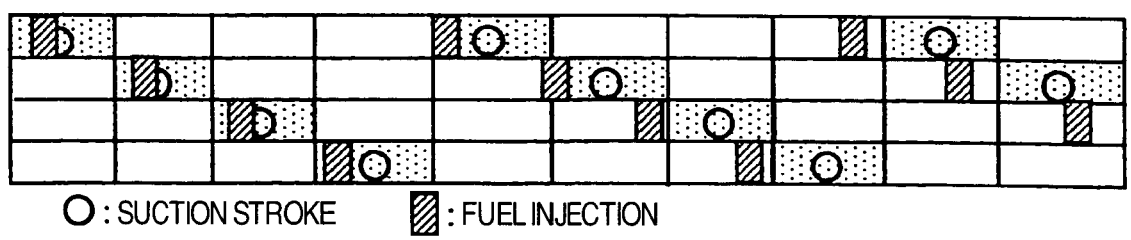
FIG. 21 is a time chart showing a fuel injection timing in the present embodiment.

FIG. 21 shows a fuel injection timing at a time of the divisional injecting time. In FIG. 21, a circle portion o indicates the suction stroke, and a hatched portion indicates a fuel injection interval. The injection timing of the fuel is set such that the injection is executed in the suction stroke at a time of making the fuel pressure higher, and the injection timing is changed to the exhaust stroke injection if the fuel pressure is turned back to the fuel pressure at the normal time, is changed to the exhaust stroke injection at a time when the divisional injection can not be executed during the suction stroke injection, or is changed from the suction stroke injection to the exhaust stroke injection in correspondence to the state of the internal combustion engine 10.

It is possible to directly detect the state of the internal combustion engine 10 by the water temperature sensor 14 or the like so as to move the fuel injection timing in correspondence to the signal thereof or move on the basis of the estimation, for example, an integrated value of an injecting number, an igniting number and an engine speed from the engine start, or the like.

In accordance with the structure mentioned above, since a quality of the air-fuel mixture is improved, and the air-fuel mixture can be formed in an optimum manner, the combustion can be improved.

Accordingly, it is possible to retard the ignition timing, and it is possible to increase the temperature of the exhaust gas on the basis of the retard the ignition timing. The retard amount of the ignition timing is determined in correspondence to the water temperature, the engine speed, the temperature of the exhaust gas or the temperature of the catalyst 16.

Figure 22:
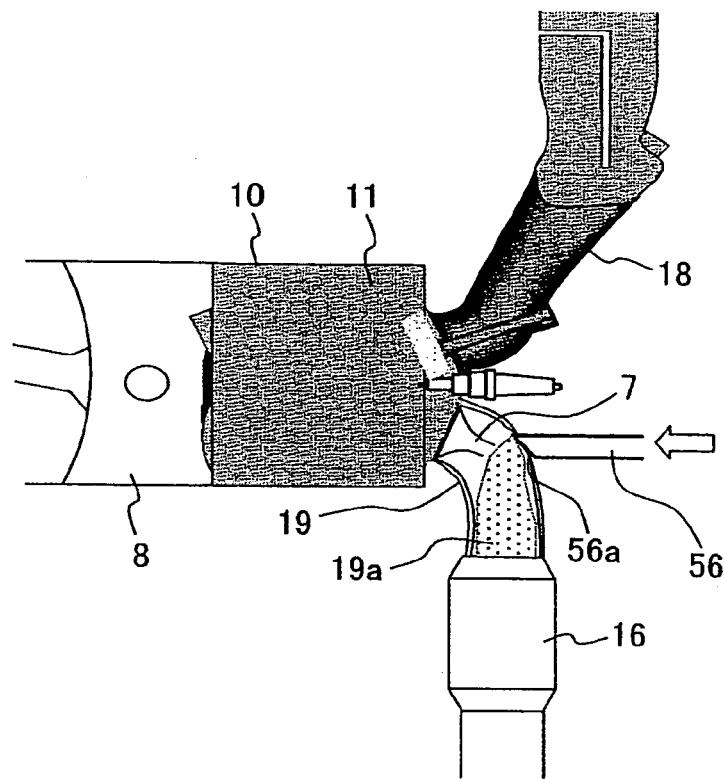
FIG. 22 is a view showing a positional relation of an exhaust pipe, a supply port of a secondary air and a catalyst from the internal combustion engine.

Next, a description will be given of an operation of the secondary air supply. FIG. 22 shows a positional relation of the exhaust pipe 19, the supply port 56a of the secondary air and the catalyst 16 from the internal combustion engine 10.

It is preferable to supply the secondary air to the position having the exhaust gas temperature as high as possible, that is, the outlet of the exhaust gas of the internal combustion engine 10, that is, the portion close to the exhaust valve 7.

An unburned gas is burned by supplying the secondary air into the exhaust pipe 19, the HC is reduced, the temperature of the exhaust gas is increased, and the catalyst 16 existing in the downstream thereof is warmed up. Accordingly, it is possible to early activate the catalyst 16 by supplying the secondary air.

Figure 23:
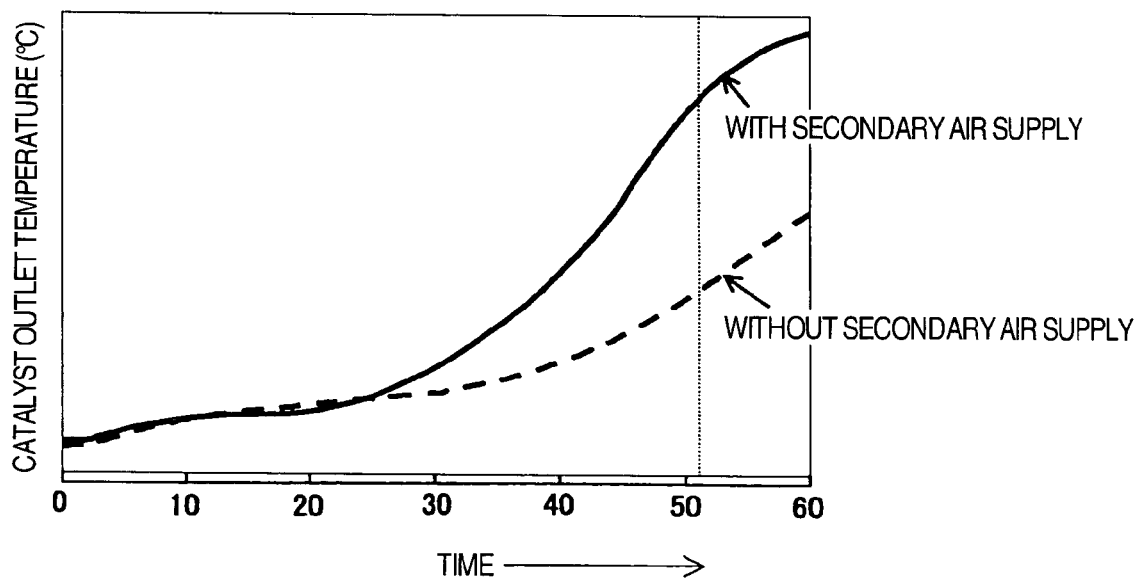
FIG. 23 is a graph showing a change of a temperature of a catalyst outlet relating to with or without the secondary air supply.
Figure 24:
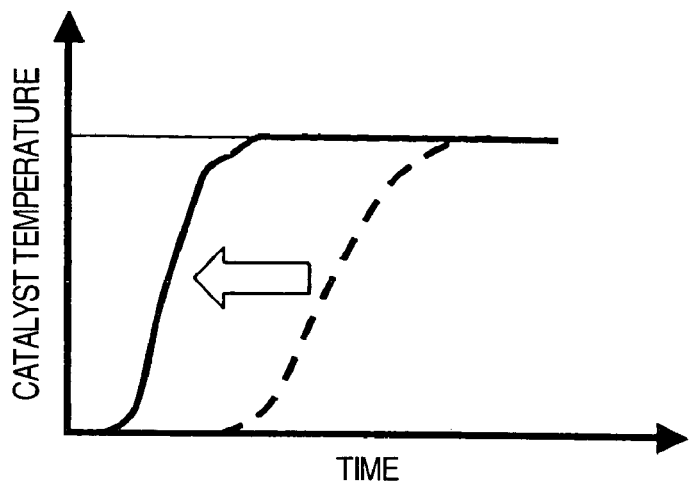
FIG. 24 is a graph showing an effect of a catalyst early activation.

FIG. 23 shows a result of test by the actual machine. A solid line shows an increase of the outlet temperature of the catalyst 16 in the case that the secondary air is supplied, and a broken line shows an increase of the outlet temperature of the catalyst 16 in the case that the secondary air is not supplied, respectively. In the case that the secondary air is supplied, the increase of the outlet temperature of the catalyst 16 becomes quickened in comparison with the case that the secondary air is not supplied, the catalyst 16 is early activated, and it is possible to reduce the exhaust gas at an area from a broken line to a solid line in FIG. 24.

Figure 25:
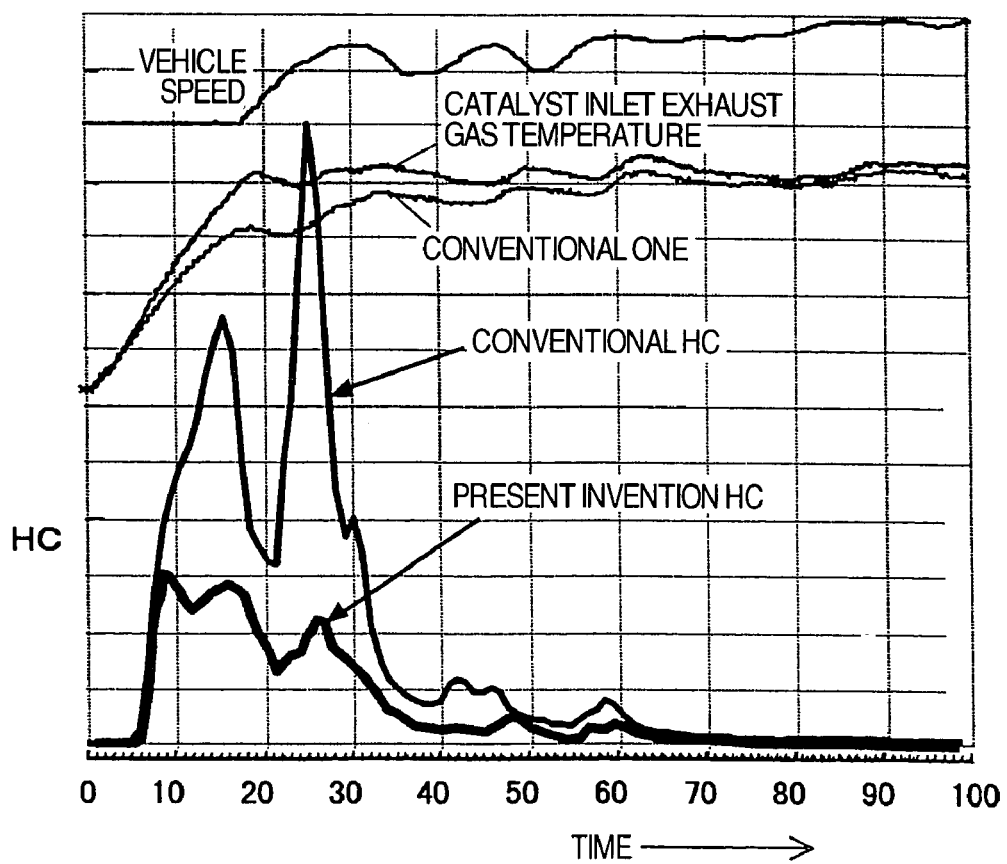
FIG. 25 is a graph showing a result of an exhaust gas measurement after starting the engine from the engine start in the case of employing the present embodiment.

FIG. 25 shows a result of measurement of the HC and the exhaust gas temperature in the catalyst outlet just after starting the engine from the engine start. It is possible to confirm that the HC can be reduced its peak and can be also reduced quickly as illustrated. Further, it is possible to confirm that the temperature of the exhaust gas can be made higher in comparison with the conventional structure as shown by the catalyst inlet exhaust gas temperature.

Figure 26:
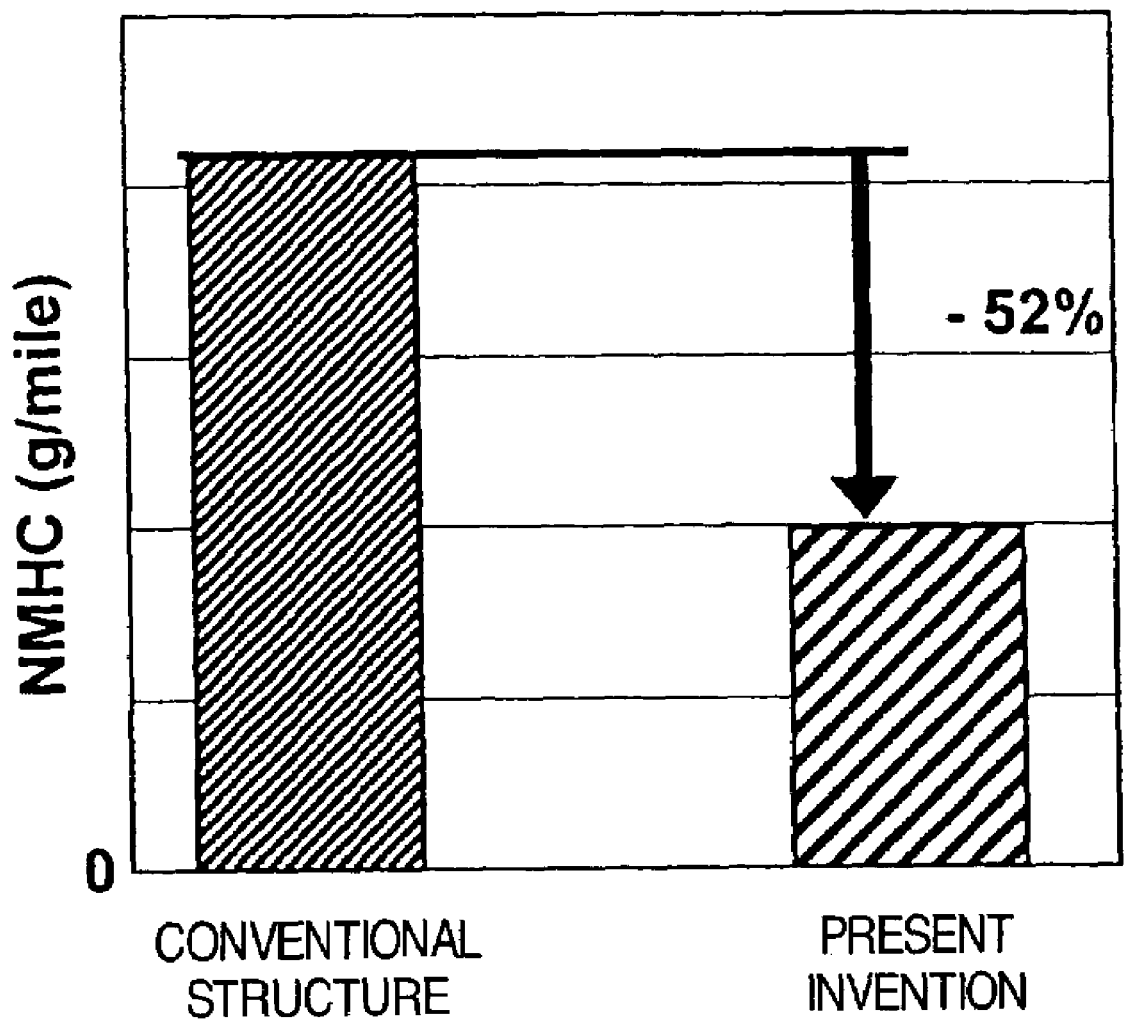
FIG. 26 is a graph showing a result of an exhaust gas measurement in LA-4-CH mode in the case of employing the present invention.

FIG. 26 shows a result of measuring the HC in the LA4-CH mode of the exhaust gas measurement in U.S.A. The HC can be 52% reduced.

Summarizing the effect of the present embodiment, since the liquid fuel is refined and divisionally injected by increasing the fuel pressure, it is possible to form a good air-fuel mixture in an optimum manner, it is possible to improve the combustion, and it is possible to reduce an amount of the harmful component in the exhaust gas exhausted from the internal combustion engine 10. Further, with respect to the exhaust gas discharged from the internal combustion engine 10, since it is possible to early activate the catalyst 16 on the basis of the secondary air supply and the retard of the ignition timing so as to purify the harmful component in the exhaust gas, it is possible to improve the exhaust gas performance.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus of a fuel injection type internal combustion engine provided with a fuel injection means executing a fuel injection in each of cylinders, wherein at a time of the engine starts, the control apparatus executes a control of increasing a fuel pressure supplied to said fuel injection means in comparison with a normal operating time just after the engine start, and a divisional injection control of divisionally injecting the fuel injection for one cycle of the engine by said fuel injection means at a plurality of times.

2. A control apparatus of a fuel injection type internal combustion engine as claimed in claim 1, wherein the control apparatus executes a control of retarding an ignition timing, at a divisional injection control time.

3. A control apparatus of a fuel injection type internal combustion engine as claimed in claim 1, wherein the control apparatus executes a control of supplying a secondary air to an engine exhaust passage after the divisional injection control is finished.

4. A control apparatus of a fuel injection type internal combustion engine provided with a fuel injection means executing a fuel injection in each of cylinders, wherein at a time of the engine starts, the control apparatus executes a control of increasing a fuel pressure supplied to said fuel injection means in comparison with a normal operating time just after the engine start, and a divisional injection control of divisionally injecting the fuel injection for one cycle of the engine by said fuel injection means at a plurality of times during a suction stroke.

5. A control apparatus of a fuel injection type internal combustion engine as claimed in claim 4, wherein the control apparatus executes a control of changing the fuel injection timing from a suction stroke time to an exhaust stroke time in correspondence to a state of the internal combustion engine after starting the engine.

6. A control apparatus of a fuel injection type internal combustion engine as claimed in claim 4, wherein the control apparatus executes a control of setting an injection timing in a suction stroke to a crank angle position having a high air flow speed at a time of starting the engine, and changing the injection timing to a crank angle position having a low air flow speed in correspondence to an engine speed after the engine speed starts ascending.

7. A control apparatus of a fuel injection type internal combustion engine as claimed in claim 5, wherein the control apparatus executes a control of setting an injection timing in a suction stroke to a crank angle position having a high air flow speed at a time of starting the engine, and changing the injection timing to a crank angle position having a low air flow speed in correspondence to an engine speed after the engine speed starts ascending.

8. A control apparatus of a fuel injection type internal combustion engine as claimed in claim 1, wherein the control apparatus executes a control of retarding an ignition timing, at a divisional injection control time.

9. A control apparatus of a fuel injection type internal combustion engine as claimed in claim 4, wherein the control apparatus executes a control of supplying a secondary air to an engine exhaust passage after the divisional injection control is finished.

* * * * *